United States Patent [19]

Kress et al.

[11] 4,043,960

[45] Aug. 23, 1977

[54] AQUEOUS DISPERSIONS OF THERMOSETTING HYDROXY-FUNCTIONAL FORMALDEHYDE COPOLYMER RESINS DERIVED FROM DIARYL OXIDES, SULFIDES, DIBENZOFURAN OR DIBENZOTHIOPHENE

[75] Inventors: Paul Joseph Kress, Muncie, Ind.; Raymond A. Plepys, Lake Jackson, Tex.

[73] Assignee: The Dow Chemical Company, Midland, Mich.

[21] Appl. No.: 650,086

[22] Filed: Jan. 19, 1976

[51] Int. Cl.$^2$ .................. C08L 61/28; C08L 29/04; C10M 3/04
[52] U.S. Cl. .................. 260/29.4 R; 260/29.4 UA; 260/29.6 WA; 428/268; 428/436
[58] Field of Search .............. 260/29.4 R, 29.4 UA, 260/29.6 WA, 829, 839, 840, 849

[56] References Cited

U.S. PATENT DOCUMENTS

3,914,194  10/1975  Smith ........................... 260/18 R

FOREIGN PATENT DOCUMENTS

46-34112  1971  Japan

*Primary Examiner*—Theodore E. Pertilla
*Attorney, Agent, or Firm*—G. R. Plotecher

[57] ABSTRACT

Aqueous dispersions comprising:

a. a thermosetting hydroxy-functional condensation copolymer, such as the copolymer of diphenyl oxide and formaldehyde;

b. a curing amount of curing agent, such as acid-catalyzed hexamethoxymethylmelamine; and c. an aqueous polyvinyl alcohol, have good shelf stability..

12 Claims, No Drawings

AQUEOUS DISPERSIONS OF THERMOSETTING HYDROXY-FUNCTIONAL FORMALDEHYDE COPOLYMER RESINS DERIVED FROM DIARYL OXIDES, SULFIDES, DIBENZOFURAN OR DIBENZOTHIOPHENE

BACKGROUND OF THE INVENTION

1. Field of the Invention

This invention relates to aqueous dispersions. In one aspect, this invention relates to aqueous dispersions comprising a thermosetting hydroxy-functional condensation copolymer. In another aspect, this invention relates to said condensation copolymer dispersions wherein a curing agent and a surfactant are present.

2. Description of the Prior Art

Japanese patent 71-34112 describes resins similar to those used herein. However, the art is void of any reference teaching an aqueous dispersion of same. This void may be attributable to the ineffectiveness of many known stabilizers.

SUMMARY OF THE INVENTION

Novel, aqueous dispersions have been discovered comprising:

a. a thermosetting hydroxy-functional condensation copolymer;
b. a curing amount of curing agent; and
c. an aqueous polyvinyl alcohol.

These dispersions are prepared by high-shear mixing of an aqueous phase containing the polyvinyl alcohol and an organic phase containing the thermosetting resin (copolymer) and a curing agent in a suitable solvent, such as methyl ethyl ketone. The organic solvent is removed by vacuum stripping leaving an aqueous dispersion with good shelf stability.

These resins have utility as glass sizing agents, metal coatings, curable fabric binders, and other applications requiring good thermal, electrical, and solvent resistance properties. Moreover, these aqueous dispersions have particular utility where solvent lacquer resins cannot be used because of safety and/or ecological considerations.

DETAILED DESCRIPTION OF THE INVENTION

The thermosetting hydroxy-functional condensation copolymers here used have the repeating unit

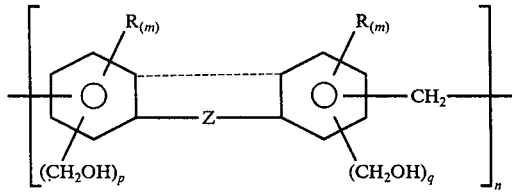

wherein R is independently an alkyl group of from 1 to about 10 carbon atoms or a halogen, Z is oxygen or sulfur, the dashed line is an optional chemical bond, the group represented by Z taken with the dashed line represents dibenzofuran and dibenzothiophene moieties, or mixtures thereof, $n$ averages about 3-10, $m$ is 0-2 and $p$ and $q$ are 0 or 1 with the proviso that the sum of $p$ and $q$ has an average value of 0.1-1 and there is an average of at least 1 hydroxymethyl group per polymer. Typical alkyls include methyl, ethyl, propyl, octyl, decyl, isopropyl, isobutyl, sec-butyl, tert-butyl, neopentyl, and the like with the branched, lower alkyls (1-5 carbon atoms) preferred. Chlorine or bromine are the preferred halogens although fluorine and iodine are also suitable. Of course, when the dashed line is absent, Z (oxygen or sulfur) is the only linkage between the benzene nuclei.

A hydroxymethyl group does not necessarily appear upon every aromatic ring in the polymer, but a hydroxymethyl group does appear at least once per every 10 repeating units. Moreover, while it is possible that some copolymer molecules may not carry a hydroxymethyl group, at least about 90 percent do in any given resin. Further, the resins are complex resins wherein the location of the various substituents are not known but their location is not essential to this invention. Likewise, the end groups are not known but they are believed to be hydrogen, hydroxymethyl groups, or acyloxy ester groups.

These hydroxymethylated copolymer resins are typically prepared by reacting a mole of diaryl-type compound, such as diphenyl oxide, with between about 1.4 and about 10 moles of formaldehyde in a molar excess of a monocarboxylic acid having 1-6 carbons, such as acetic acid. The reactants are heated in the presence of a catalytic amount of a strong inorganic or organic acid, such as sulfuric acid or p-toluene sulfonic acid, in a temperature range from about 90° to about 150° C. Acyloxy resins are recovered from the reaction medium by precipitation with water, filtering and washing. The acyloxy resins are then subjected to basic hydrolysis and the hydroxymethylated resins are recovered and dried. The preferred resins in this invention are the condensation polymers of diphenyl oxide and formaldehyde.

Since the hydroxy-functional condensation copolymers are not self curing, a curing agent is incorporated into the aqueous dispersion. Any strong acid (pKa of about 2.1 or less) is a suitable curing agent. Illustrative curing acids include aqueous sulfuric acid, phosphoric acid, p-toluene sulfonic acid, dodecyl benzene sulfonic acid, trichloroacetic acid, oxalic acid, and the like.

The invention requires a curing amount of curing agent. The typical minimum amount of curing acid used is about 0.05 weight percent and the typical maximum amount used is about 5 weight percent (all weight percents used herein are by weight of copolymer unless otherwise indicated). For the stronger curing acids, such as sulfuric or p-toluene sulfonic acid, the preferred minimum amount is about 0.05 weight percent and the preferred maximum amount is about 2 weight percent. For the weaker curing acids, such as oxalic or trichloroacetic acid, the preferred minimum amount is about 1 weight percent and the preferred maximum amount is about 3 weight percent. Of course, these curing acid amounts are in excess of any amounts necessary to neutralize residual base that may be present in the copolymer.

Acid-catalyzed hexamethoxymethylmelamine is also a curing agent. Since this curing agent cures the copolymers faster than the curing acids, it is a preferred curing agent. A curing amount of said melamine is required with the typical minimum amount being about five parts per hundred of resin (copolymer) and preferably about ten parts per hundred of resin. The practitioner's convenience is the only limitation upon the maximum amount of said melamine that can be used.

Two types of acids can catalyze the curing reaction between hexamethoxymethylmelamine and the copolymer. These types of acids are latent and nonlatent. As used herein, "latent acids" mean those compounds which upon decomposition achieve sufficient acidity to catalyze the curing (cross-linking) reaction between the copolymer and the hexamethoxymethylmelamine. "Nonlatent acids," of course, mean those compounds which do not have to decompose to achieve said sufficient acidity, i.e., they are already of sufficient acidity to catalyze said curing reaction. The latent is preferred over the nonlatent because it (latent) gives the dispersion a longer shelf life.

The nonlatent-acid catalysts here used are the curing acids previously described. Catalytic amounts of same are required with the typical minimum amount being about 0.05 weight percent and the typical maximum amount being about 5 weight percent. The preferred amounts are the same as that described for the curing acids. In other words, the preferred amount of nonlatent acid present in the dispersion is the same regardless of whether hexamethoxymethylmelamine is present or not. If said melamine is present, the nonlatent acid will catalyze the curing reaction between the copolymer (resin) and said melamine. If said melamine is absent, the nonlatent acid itself will cure the copolymer.

The preferred latent-acid catalysts here used, such as diammonium hydrogen phosphate or ammonium persulfate, are alkaline and will not catalyze a cure in the absence of heat. For example, a dispersion of copolymer, stabilizer, hexamethoxymethylmelamine, and diammonium hydrogen phosphate is limited in shelf-life only by the settling instability, if any, of the dispersion itself. However, when the dispersion is heated, the diammonium hydrogen phosphate decomposes to monoammonium dihydrogen phosphate (with the loss of ammonia). Monoammonium dihydrogen phosphate is of sufficient acidity to catalyze the curing reaction between hexamethoxymethylmelamine and the resin. A level of at least about 2 weight percent is sufficient to initiate cure, but at least about 10 weight percent is preferable.

A hydrolyzed polyvinyl acetate, i.e., polyvinyl alcohol, is here used to stabilize the dispersion. Other known stabilizers, such as sodium lauryl sulfate, tertiary sulfonium salts, and polyether alcohols, are ineffective. Polyvinyl acetate that is at least about 50 percent hydrolyzed can be used, although at least about 75 percent hydrolyzed polyvinyl acetate is preferred. The polyvinyl alcohol comprises at least about 1 weight percent of the aqueous solution used to prepare the dispersion and preferably about 3 weight percent.

Having thus described the individual components of this invention, the aqueous dispersion generally includes by weight:
a. at least about 40 percent, preferably at least about 45 percent, water;
b. from about 1 to about 60 percent, preferably from about 30 to about 50 percent, resin;
c. from about 0.01 to about 10 percent, preferably from about 0.02 to about 6 percent, curing agent; and
d. from about 0.5 to about 3 percent, preferably from about 1 to about 2 percent, polyvinyl alcohol.

Obviously, practical considerations, such as efficiency, are the only limitations upon the minimum amount of resin that can be used. Likewise, practical considerations, such as incorporation into the cured resin, economics, and the like, are the only limitations on the maximum amount of latent-acid catalyst and polyvinyl alcohol that can be used.

This invention is typically prepared by mixing a volume of 50 weight percent methyl ethyl ketone resin solution with an equal volume of about a 3 weight percent aqueous polyvinyl alcohol solution in a high shear apparatus, such as an Eppenbach Mixer. However, as evident from the preceding paragraph, this invention can also be prepared by using an aqueous solution to resin solution volume ratio of from about 0.75 to 1 to about 3 to 1. A stable, aqueous emulsion of methyl ethyl ketone resin is obtained when the emulsion droplets are reduced to about one micron in size. A stable dispersion is achieved by evaporating the methyl ethyl ketone from this emulsion under vacuum.

Solvents other than methyl ethyl ketone can be used to dissolve the resin but they should be both substantially water immiscible and of similar density to water. For example, acetone is a good solvent for these resins but it is too soluble in water and, consequently, the resin precipitates before it can be dispersed. Methylene chloride on the other hand, while also a good resin solvent, produces emulsion droplets that settle too quickly because of their high density. Tetrahydrofuran and dioxane are representative of other suitable solvents. Of course, at least sufficient solvent to dissolve the resin is used.

The following examples are illustrative of certain specific embodiments of this invention. However, these examples are for illustrative purposes only and are not to be construed as limitations upon the invention.

SPECIFIC EMBODIMENTS

EXAMPLE 1

A hydroxymethylated diphenyl oxide resin (100 g) having an average molecular weight of about 1200 was dissolved in methyl ethyl ketone (100 g). To this solution was added p-toluene sulfonic acid (2 g) also dissolved in methyl ethyl ketone (6 g). A separate aqueous phase was prepared consisting of deionized water (100 g), 78 percent hydrolyzed polyvinyl acetate (3 g), and 3 drops of a defoamer (manufactured by Hercules under the trade name S-918). The organic phase was slowly added to the aqueous phase with high shear mixing to form an emulsion. After the methyl ethyl ketone solvent was vacuum stripped from the emulsion, a stable, aqueous dispersion of a hydroxymethylated diphenyl oxide resin remained.

A dispersion of this resin cast on glass and dried for 30 minutes at about 175° C produced a brown transparent film insoluble in organic solvents. This film also exhibited excellent thermal and electrical resistant properties.

CONTROLS 1-3 AND EXAMPLES 2-8

Additional films were prepared in a manner similar to Example 1 and were subjected to impact and solvent resistant testing. The results are shown in Table I.

TABLE I
PHYSICAL PROPERTIES OF HYDROXYMETHYLATED DIPHENYL OXIDE FILMS FROM AQUEOUS DISPERSIONS

| Control | Cymel 303[1] (phr)[2] | Acid Catalyst (wt.%)[3] | Cure Time (min) | Cure Temp (°C) | Reverse Impact | Double Rubs[8] | MEK[7] |
|---|---|---|---|---|---|---|---|
| 1 | 5 | — | 10 | 175° | — | | <<5 |
| 2 | 10 | 125 — | 20 | 175° | — | | <5 |
| 3 | — | (NH$_4$)$_2$HPO$_4$[6] (2) | 10 | 175° | — | No cure | — |
| Example | | | | | | | |
| 2 | 10 | TsOH[4] (2) | 10 | 175° | — | | 2 |
| 3 | 10 | (NH$_4$)$_2$S$_2$O$_8$[5] (1) | 10 | 175° | — | | 95 |
| 4 | 5 | (NH$_4$)$_2$HPO$_4$ (2) | 10 | 175° | <20 | | 30 |
| 5 | 10 | (NH$_4$)$_2$HPO$_4$ (2) | 10 | 175° | 160 | 60 | |
| 6 | 10 | (NH$_4$)$_2$HPO$_4$ (2) | 15 | 125° | 160 | | 30 |
| Control | | | | | | | |
| 7 | 10 | (NH$_4$)$_2$HPO$_4$ (2) | 90 | 125° | 160 | | 50 |
| 8 | 10 | (NH$_4$)$_2$HPO$_4$ (2) | 180 | 125° | 160 | | 75 |

Footnotes
[1]A trade name for hexamethoxymethylmelamine manufactured by American Cyanamide.
[2]Parts per hundred of resin.
[3]Weight percent by weight of resin.
[4]p-Toluene sulfonic acid.
[5]Ammonium persulfate.
[6]Diammonium hydrogen phosphate.
[7]Methyl ethyl ketone.
[8]MEK rub resistance was tested with a solvent soaked, cloth covered end of a 2 lb ball-peen hammer.

A comparison of Controls 1 and 2 with Examples 2 and 3 show the necessity of acid catalysts while Control 3 shows that diammonium hydrogen phosphate cannot by itself cure the resin. Examples 4 and 5 show that the preferable amount of hexamethoxymethylmelamine is about 10 phr. Examples 6–8 show the good properties obtained even at short, low temperature cures. All the above cured films showed high gloss and only the strong-acid catalyzed Example 2 showed slight yellowing.

CONTROLS 4–6

Example 1 was repeated except other known stabilizers were substituted for the polyvinyl alcohol. The results are presented in Table II. A comparison of Table II with the results of Example 1 clearly show that only polyvinyl alcohol was effective.

TABLE II
STABILIZER EFFECTIVENESS FOR PRODUCING HYDROXYMETHYLATED DIPHENYL OXIDE AQUEOUS DISPERSIONS

| Control | Stabilizer | Effectiveness | Description |
|---|---|---|---|
| 4 | P&G Emulsifier 104[1] (30% active) | No Dispersion | Rapidly-settling white gum |
| 5 | Triton X-100[2] (100% active) | " | " |
| 6 | Dodecylbenzyl-dimethylsulfonium chloride[3] | " | — |

[1]A trade name for sodium lauryl sulfate manufactured by Procter & Gamble Co.
[2]A trade name for a polyether alcohol manufactured by Rohm & Haas Co.
[3]A tertiary sulfonium salt

EXAMPLE 9

Glass wool (manufactured by Corning Glass under the tradename Pyrex) was dipped into a dispersion prepared in similar fashion to Example 1. The dipped glass wool was drained dry and heated for 15 minutes at about 150° C. The resulting product was a hard and stiff mat of glass fibers indicating both good adhesion between fibers and glass sizing agent utility.

While the invention has been described with specific reference to particular embodiments, it is to be understood that it is not to be limited thereto but is to be construed broadly and restricted solely by the scope of the appended claims.

What is claimed is:
1. An aqueous dispersion comprising:
  a. a thermosetting hydroxy-functional condensation copolymer having the repeating unit

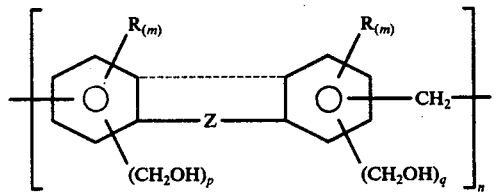

wherein R is independently an alkyl group of from 1 to about 10 carbon atoms or a halogen, Z is oxygen or sulfur, the dashed line is an optional chemical bond, the group represented by Z taken with the dashed line represents dibenzofuran and dibenzothiophene moieties, or mixtures thereof, $n$ is 3–10, $m$ is 0–2 and $p$ and $q$ are 0 or 1 with the proviso that the sum of $p$ and $q$ has an average value of 0.1–1 and there is an average of at least 1 hydroxymethyl group per polymer;
  b. a curing amount of curing agent selected from the group consisting of strong acids with a pKa of about 2.1 or less and acid-catalyzed hexamethoxymethylmelamine; and
  c. at least about a 1 weight percent aqueous polyvinyl alcohol.
2. The aqueous dispersion of claim 1 wherein (c) is about a 3 percent polyvinyl alcohol.

3. The aqueous dispersion of claim 2 wherein the polyvinyl alcohol is at least about 50 percent hydrolyzed polyvinyl acetate.

4. The aqueous dispersion of claim 2 wherein Z of (a) is oxygen.

5. The aqueous dispersion of claim 4 wherein the dashed line of (a) is absent.

6. The aqueous dispersion of claim 5 wherein each R of (a) is a branched, lower alkyl.

7. The aqueous dispersion of claim 5 wherein each $m$ of (a) is zero.

8. The aqueous dispersion of claim 7 wherein the curing agent of (b) is acid-catalyzed hexamethoxymethylmelamine.

9. The aqueous dispersion of claim 8 wherein the hexamethoxymethylmelamine is catalyzed by a latent acid.

10. The aqueous dispersion of claim 9 wherein the latent acid is diammonium hydrogen phosphate or ammonium persulfate.

11. The aqueous dispersion of claim 10 wherein the latent acid catalyst is present in an amount of at least about 2 weight percent.

12. The aqueous dispersion of claim 10 wherein the acid catalyst is present in an amount of at least about 10 weight percent.

* * * * *